US012647327B2

(12) United States Patent
Kheirkhah et al.

(10) Patent No.: US 12,647,327 B2
(45) Date of Patent: Jun. 2, 2026

(54) METHODS AND APPARATUS FOR NATIVE 3GPP SUPPORT OF ARTIFICIAL INTELLIGENCE AND MACHINE LEARNING OPERATIONS

(71) Applicant: InterDigital Patent Holdings, Inc., Wilmington, DE (US)

(72) Inventors: Morteza Kheirkhah, London (GB); Ulises Olvera-Hernandez, Saint-Lazare (CA); Guanzhou Wang, Brossard (CA); Zhibi Wang, Woodridge, IL (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/833,502

(22) PCT Filed: Jan. 23, 2023

(86) PCT No.: PCT/US2023/011338
§ 371 (c)(1),
(2) Date: Jul. 26, 2024

(87) PCT Pub. No.: WO2023/146820
PCT Pub. Date: Aug. 3, 2023

(65) Prior Publication Data
US 2025/0219909 A1 Jul. 3, 2025

Related U.S. Application Data

(60) Provisional application No. 63/303,772, filed on Jan. 27, 2022.

(51) Int. Cl.
*H04L 41/16* (2022.01)
*H04L 41/14* (2022.01)
*H04L 41/149* (2022.01)

(52) U.S. Cl.
CPC ............ *H04L 41/16* (2013.01); *H04L 41/145* (2013.01); *H04L 41/149* (2022.05)

(58) Field of Classification Search
CPC ..... H04L 41/16; H04L 41/145; H04L 41/149; H04L 41/147; H04L 67/02; H04L 65/80; H04L 67/61; H04W 8/183
See application file for complete search history.

(56) References Cited

U.S. PATENT DOCUMENTS 6,385,454 B1 5/2002 Bahl et al.
2011/0106436 A1* 5/2011 Bill .................... G01C 21/3407
701/467

(Continued)

OTHER PUBLICATIONS

3GPP TS 23.401 V17.3.0 (Dec. 23, 2021) Technical Specification Group Services and System Aspects; General Packet Radio Service (GPRS) enhancements for Evolved Universal Terrestrial Radio Access Network (E-UTRAN) access (Release 17), 450 pages.

(Continued)

*Primary Examiner* — Austin J Moreau
*Assistant Examiner* — Thao D Duong
(74) *Attorney, Agent, or Firm* — Majid Albassam

(57) ABSTRACT

Methods and apparatus for supporting artificial intelligence and machine learning operations in a 3GPP communication network are provided. A method may include receiving, by a WTRU, an indication of requirements and/or constraints associated with one or more WTRU applications. Based on the requirements and/or constraints associated with the one or more WTRU applications, the method may include determining one or more machine learning (ML) based analytics, data, and/or predictions to request from a network and/or internal WTRU ML modules. The method may then include transmitting, to the network and/or the internal WTRU ML modules, a request or subscription for the one or more ML based analytics, data, and/or predictions, and receiving a (Continued)

response or notification of the one or more ML based analytics, data, and/or predictions from the network and/or the internal WTRU ML modules.

17 Claims, 10 Drawing Sheets

(56)                    References Cited

U.S. PATENT DOCUMENTS

| | | | | |
|---|---|---|---|---|
| 2014/0278051 | A1* | 9/2014 | McGavran | G01C 21/3617 |
| | | | | 706/45 |
| 2020/0288296 | A1* | 9/2020 | Fiorese | H04W 64/006 |
| 2021/0144629 | A1 | 5/2021 | Wang | |
| 2021/0212136 | A1* | 7/2021 | Lee | H04W 48/16 |
| 2022/0417768 | A1 | 12/2022 | Yao et al. | |
| 2023/0164690 | A1* | 5/2023 | Yang | H04W 52/0203 |
| | | | | 370/311 |
| 2023/0362056 | A1* | 11/2023 | Lucas | H04L 41/0813 |
| 2024/0104074 | A1* | 3/2024 | Cember | G06F 16/909 |
| 2024/0340643 | A1* | 10/2024 | Takakura | H04W 12/06 |

OTHER PUBLICATIONS

"3rd Generation Partnership Project; Technical Specification Group Services and System Aspects; Architecture enhancements for 5G System (5GS) to support network data analytics services (Release 17)", 3GPP TS 23.288 V17.1.0, Jun. 2021, 192 pages.

"3rd Generation Partnership Project; Technical Specification Group Core Network and Terminals; Non-Access-Stratum (NAS) protocol for 5G System (5GS); Stage 3; (Release 17)", 3GPP TS 24.501 V17.5.0, Dec. 2021, 916 pages.

3rd Generation Partnership Project; Technical Specification Group Services and System Aspects, System Architecture for the 5G System (5GS); Stage 2, (Release 17), 3GPP TS 23.501 V17.1.1, Jun. 2021, 526 pages.

IETF RFC 7549. Hypertext Transfer Protocol Version 2 (HTTP/2), https://datatracker.ietf.org/doc/html/rfc7540, May 2015, 95 pages.

Third Generation Partnership Project (3GPP), "Technical Specification Group Services and System Aspects, Procedures for the 5G System (5GS); Stage 2 (Release 17)", 3GPP TS 23.502 V17.1.0, Jun. 2021, 692 pages.

3rd Generation Partnership Project; Technical Specification Group Services and System Aspects; Architecture enhancements for 5G System (5GS) to support network data analytics services (Release 17), 3GPP Standard; 3GPP TS 23.288, No. V17.3.0, Dec. 23, 2021, pp. 24-52.

3rd Generation Partnership Project; Technical Specification Group Services and System Aspects;Architecture enhancements for 5G System (5GS) to support network data analytics services(Release 17); 3GPP TS 23.288 V17.3.0, Dec. 2021.

3rd Generation Partnership Project; Technical Specification Group Services and System Aspects; General Packet Radio Service (GPRS) enhancements for Evolved Universal Terrestrial Radio Access Network; 3GPP TS 23.401 V17.3.0, Dec. 2021(E-UTRAN) access(Release 17).

* cited by examiner

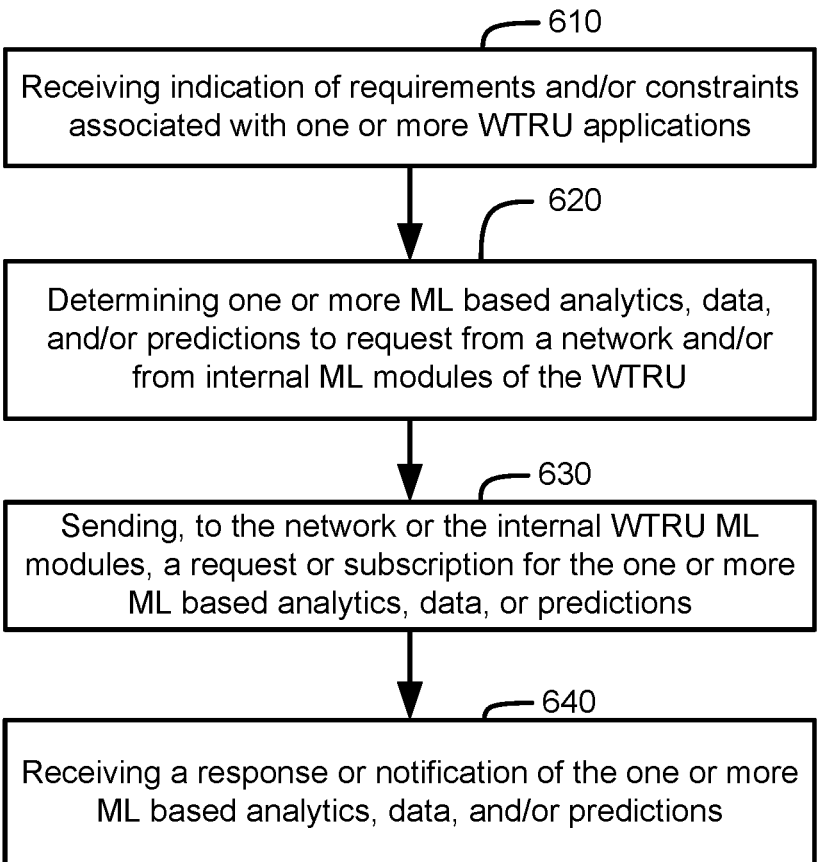

610

Receiving indication of requirements and/or constraints associated with one or more WTRU applications

620

Determining one or more ML based analytics, data, and/or predictions to request from a network and/or from internal ML modules of the WTRU

630

Sending, to the network or the internal WTRU ML modules, a request or subscription for the one or more ML based analytics, data, or predictions

640

Receiving a response or notification of the one or more ML based analytics, data, and/or predictions

FIG. 6

METHODS AND APPARATUS FOR NATIVE 3GPP SUPPORT OF ARTIFICIAL INTELLIGENCE AND MACHINE LEARNING OPERATIONS

CROSS-REFERENCE TO RELATED APPLICATIONS

This application is a U.S. National Stage Application under 35 U.S.C. 371 of International Patent Application No. PCT/US2023/011338, filed Jan. 23, 2023, which claims the benefit of U.S. Patent Application No. 63/303,772, filed Jan. 27, 2022, and is incorporated herein by reference it its entirety for all purposes.

FIELD

Certain embodiments may relate, for example, at least to methods and apparatus for supporting artificial intelligence (AI) and machine learning (ML) operations in 3GPP-compliant wireless communication networks.

BACKGROUND

Machine learning (ML) may be considered an area of artificial intelligence (AI), in which algorithms build a model based on training data to make predictions without being specifically programmed to do so. Federated learning (FL) is a ML technique that trains an algorithm across multiple decentralized servers or edge devices having local data samples that are not shared. In communications systems or networks, FL may be seen as a method to perform distributed machine learning tasks among wireless transmit/receive units (WTRUs) that may have access to local data, which may be suitable for learning models. For example, a WTRU may compute update(s) to a global model using local training data and may transmit the updates to a central server over a wireless network. Some embodiments described herein have been designed with the foregoing in mind.

SUMMARY

An embodiment may be directed to a Wireless Transmit/ Receive Unit (WTRU) that comprises a transceiver and/or processor configured to receive an indication of at least one of requirements or constraints associated with one or more WTRU applications. Based on the at least one of requirements or constraints associated with the one or more WTRU applications, the processor may be configured to determine one or more machine learning (ML) based analytics, data, or predictions to request from at least one of a network or internal WTRU ML modules. The transceiver and/or processor may be configured to send, to the network or the internal WTRU ML modules, a request or subscription for the one or more ML based analytics, data, or predictions, and to receive a response or notification of the one or more ML based analytics, data, or predictions from at least one of the network or the internal WTRU ML modules.

An embodiment may be directed to a method implemented by a Wireless Transmit/Receive Unit (WTRU). The method may include receiving an indication of at least one of requirements or constraints associated with one or more WTRU applications and, based on the at least one of requirements or constraints associated with the one or more WTRU applications, determining one or more machine learning (ML) based analytics, data, or predictions to request from at least one of a network or internal WTRU ML modules. The method may also include sending, to the network or the internal WTRU ML modules, a request or subscription for the one or more ML based analytics, data, or predictions, and receiving a response or notification of the one or more ML based analytics, data, or predictions from at least one of the network or the internal WTRU ML modules.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein:

FIG. 6 is a flow chart of a method according to an embodiment.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein.

Example Communication Systems

Figure 1A:
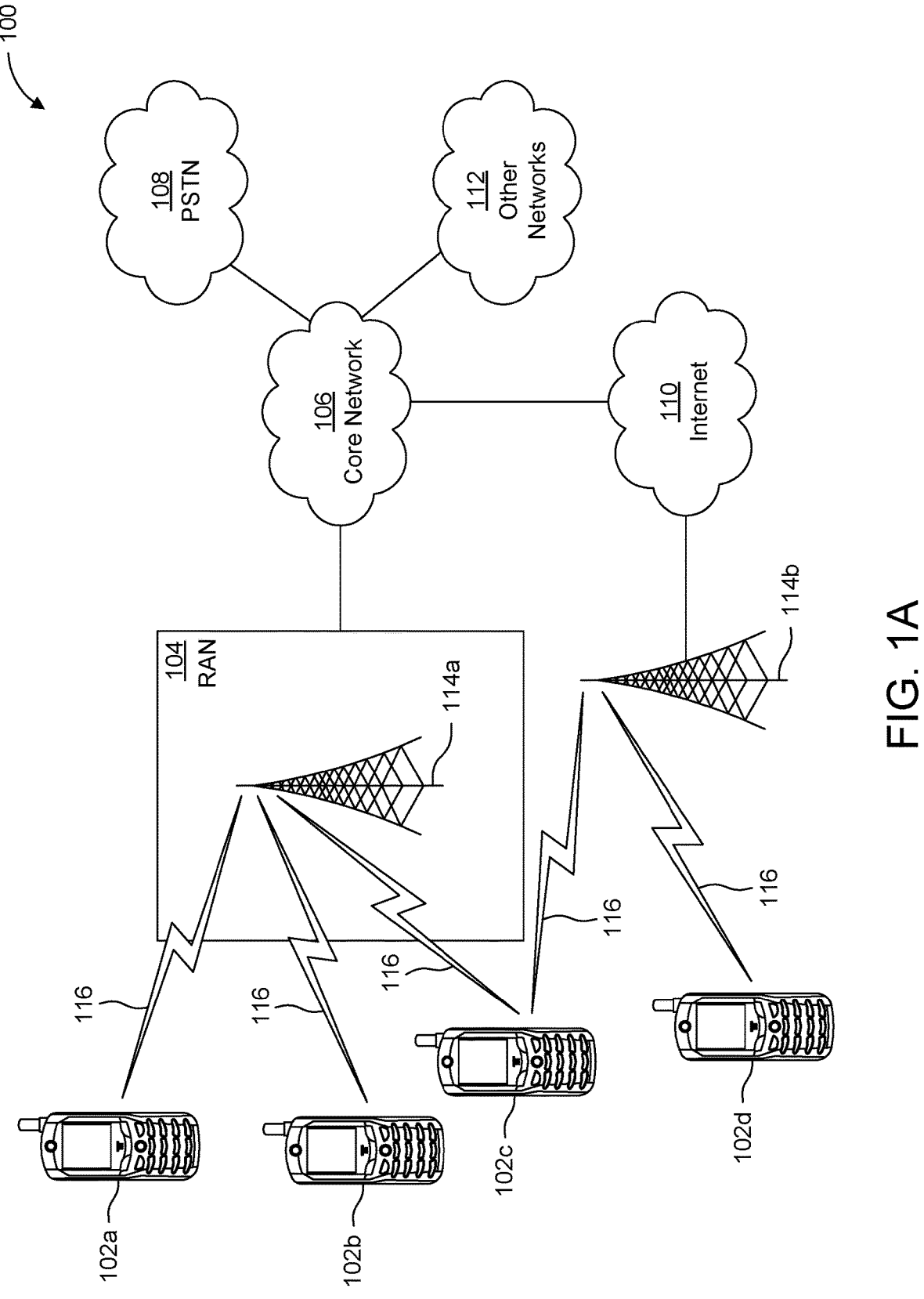
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d, or any other WTRU referenced herein, may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
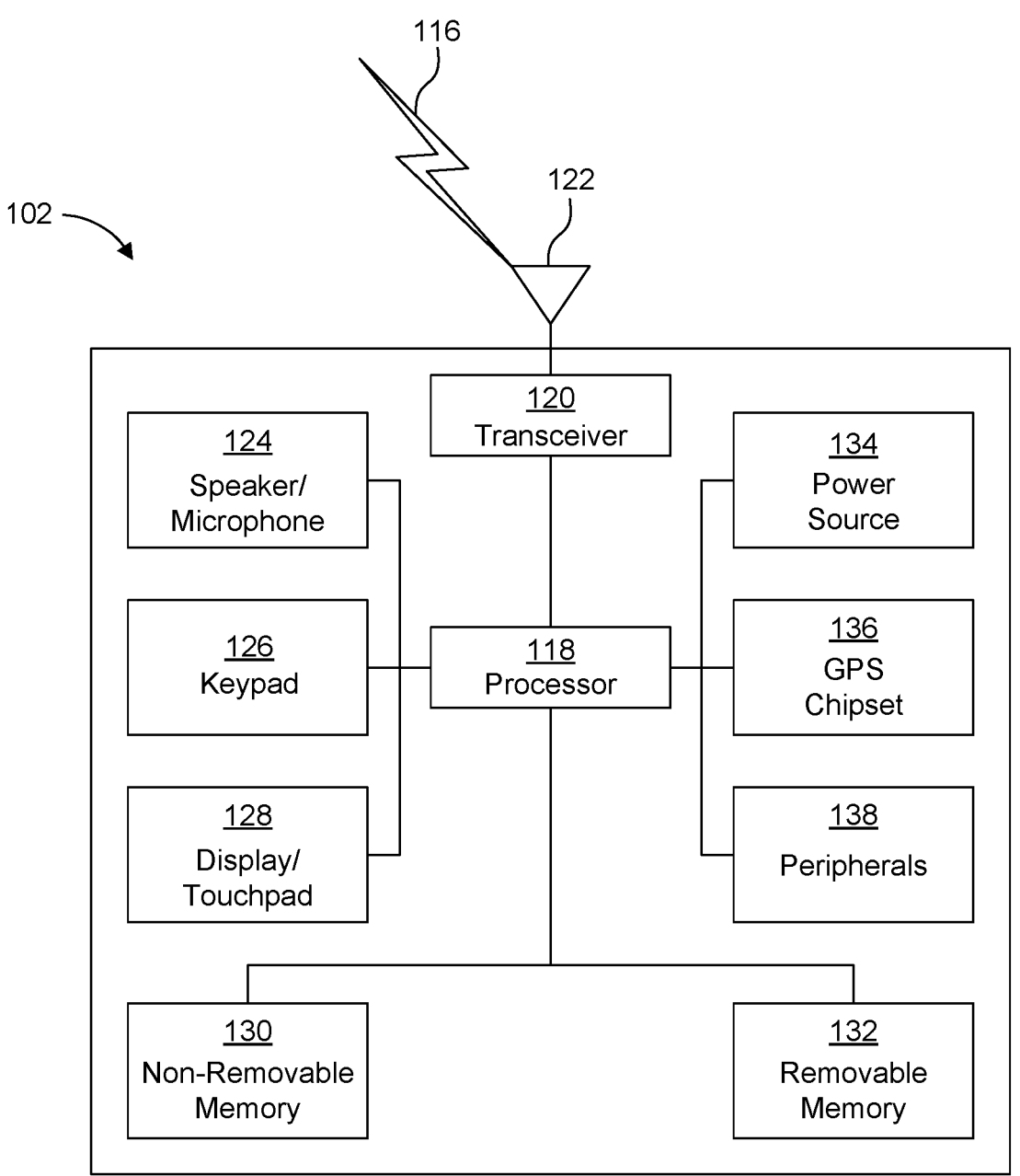
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
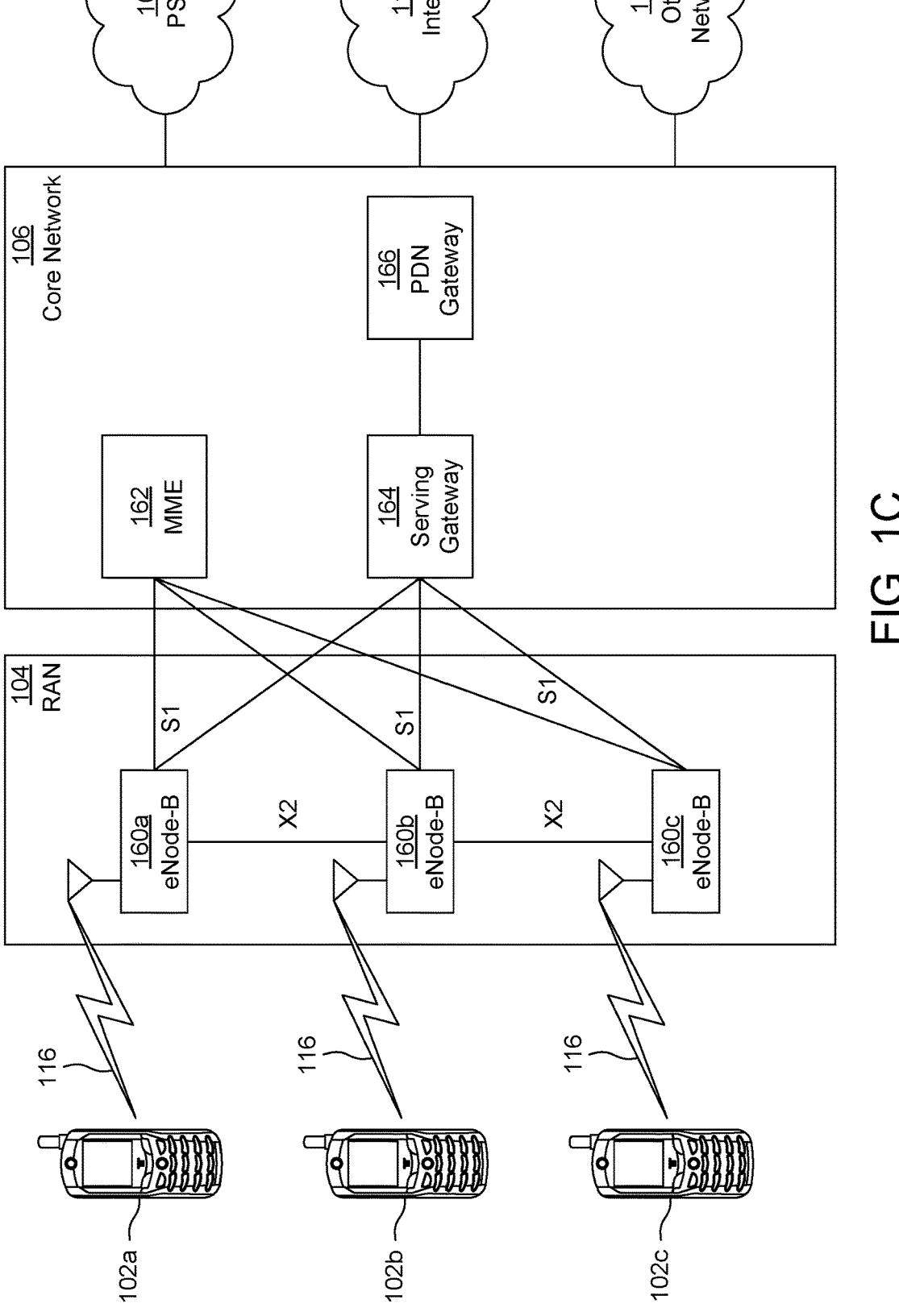
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ and 20 MHz bandwidths in the TV White Space (TVWS) spectrum, and 802.11ah supports 1 MHZ, 2 MHz, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
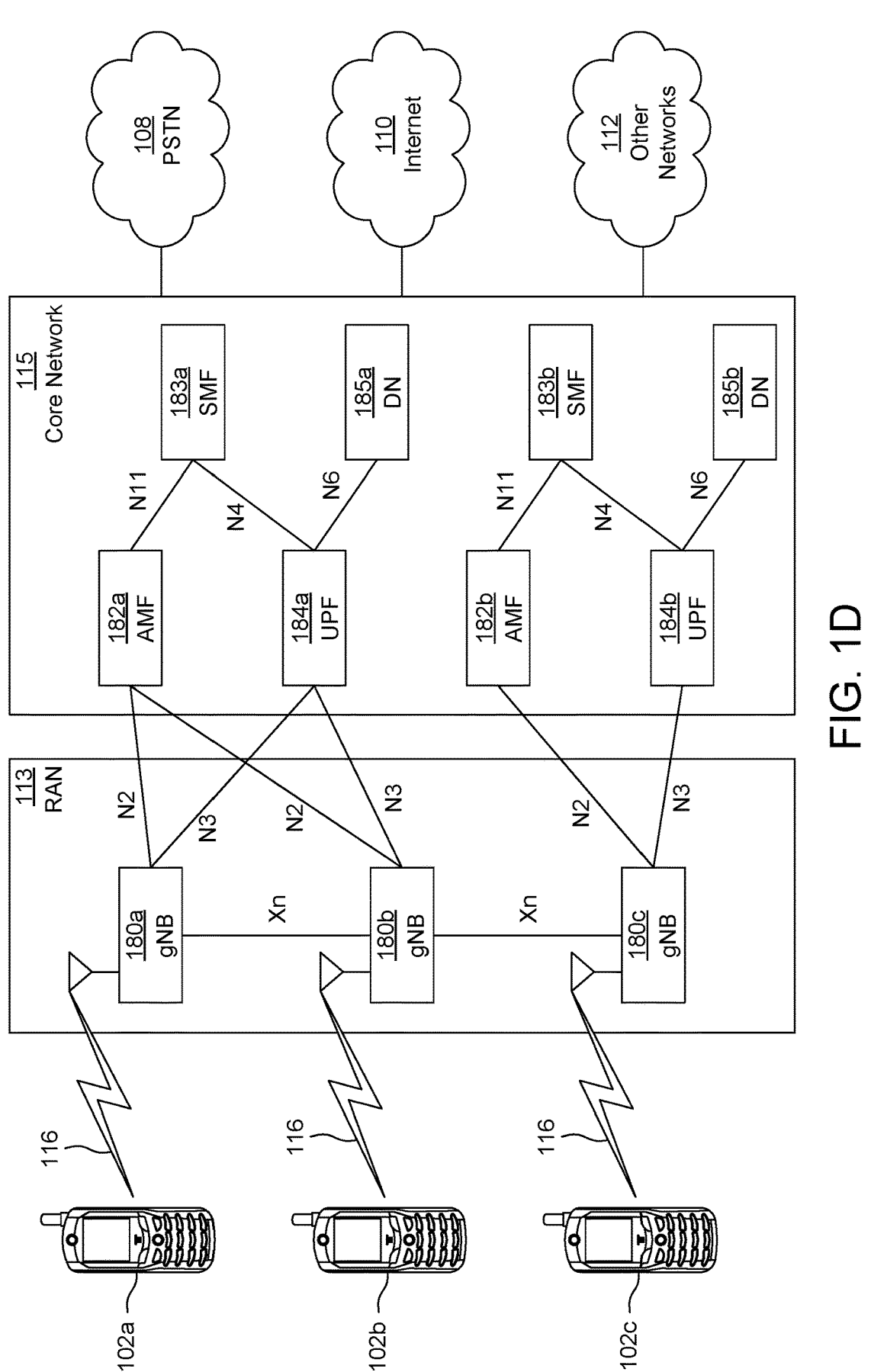
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the uplink (UL) and/or downlink (DL), support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF a82a, 182b may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane Qos, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples of Native 3GPP Support of Artificial Intelligence and Machine Learning Operations

Federated Learning

In a Federated Learning (FL) training model, an AI/ML Application Server (AS) selects a set of WTRUs/devices to participate in a distributed training session. Every training session includes several training cycles. During each cycle, a set of WTRUs is selected by the AS responsible for training a global model. In an ideal scenario, the AS should repeatedly re-select a group of WTRUs that are performing well. However, it may be necessary to shuffle participants (WTRUs) to obtain better training results. Particularly, increasing the diversity of the participants in a training session implies a more diverse environment (input dataset) to be used in training, which ultimately should result in a more accurate ML model.

To that end, selecting a set of WTRUs for a given training session is difficult because an AI/ML application server requires awareness of each participant's states and/or conditions in advance. If a set of selected WTRUs do not perform well within a training cycle (e.g., they cannot deliver their local computation to the AS on time), then two problems may arise: (1) wasting of the resources of several 3GPP entities (e.g., WTRU, Radio Access Network (RAN) and the Core Network (CN)); and (2) increasing the time required for the neural network model to converge to a stable point (e.g., the point where it minimizes the error while maximizing the accuracy).

While the decision as to which WTRUs should participate in a training session is made by the AS, making such a decision may need assistance from the 3GPP system directly, particularly from the WTRU and/or the 5G Core Network (5GC). For example, if a WTRU is moving, it may be advisable to predict its mobility pattern and/or other conditions and to inform the AS of the WTRU's predicted mobility or other conditions because the predicted mobility or other conditions of the WTRU may suggest that the WTRU signal quality and/or strength may soon become extremely weak or that the WTRU will be heavily involved with other computationally intensive activities. In such cases, this may help the AS determine, for example, not to select this WTRU for the next training cycle, but rather to wait for the WTRU to enter more suitable conditions for training.

Some useful potential predictions that a WTRU may provide to the AS may include, for instance: (i) availability of computational resources, such as Graphics Processing Unit (GPU) and/or Central Processing Unit (CPU) resources, which may also consider a prediction of potential processing delays; (ii) network capacity, e.g., available bitrate; (iii) mobility pattern in the form of prediction of poor signal strength/quality; and/or (iv) battery status.

These predictions may assist the WTRU application and AS by providing some indications about the WTRU's likely state and/or condition in the future (e.g., near future). Combining such information and the current WTRU state, these applications can intelligently adapt their behavior. Note that the AS may also utilize an Application Function (AF) server for managing its session-level aspects. The AF may be hosted in a trusted or untrusted domain [5].

A similar set of predictions may be fedback to the AF/AS and WTRU from the 3GPP CN (e.g., via NWDAF [5]). These predictions can also be used by other entities within the 3GPP system, such as the User Plane Function (UPF) to handle the FL traffic more gracefully. To obtain such predictions, a set of key parameters in the CN may be monitored, such as: downlink data delivery status from the UPF and/or Session Management Function (SMF), the number of registered WTRUs and/or established Protocol Data Unit (PDU) Sessions for a network slice subject to network slice admission control from the Network Slice Access Control Function (NSACF), the number of WTRUs present in a geographical area from the Access and Mobility Management Function (AMF), PDU Session status from the SMF, location reporting from the AMF and/or Gateway Mobile Location Center (GMLC), and/or availability (of WTRU) after downlink data notification failure occurred from the AMF.

To handle the traffic of Federated Learning (FL) applications and other emerging applications with similar traffic patterns, it may be advantageous to utilize state-of-the-art AI/ML techniques within the 3GPP system (e.g., at the WTRU and 5GC). These intelligent techniques are known to produce close to optimal results very quickly, outperforming conventional optimization algorithms that are known to perform poorly or slowly under complex conditions. The 3GPP system has already provided such capabilities within the 5GC by utilizing a Network Data Analytics Function (NWDAF) [7]. However, such functionality is not provided in the WTRU. That said, these AI/ML techniques (both hosted in the 5GC and the WTRU) are often required to communicate with one another, e.g., to exchange analytics, data, and/or predictions. For example, an NWDAF running in the 5GC may need some predictions from the WTRU, or a prediction module running in the WTRU may need to consume some analytics from NWDAFs running in the 5GC.

Such a bidirectional communication channel does not currently exist in the 3GPP standards.

Also, once these AI/ML-based components are within both the WTRU and the CN (in a standardized way), it will be beneficial to use their results to adjust the behavior of applications (e.g., the WTRU applications and $AS_s$) and optimize the 3GPP resources.

Some example embodiments may address at least the following shortcomings: a lack of a unified and flexible architecture to exploit AI/ML techniques to produce intelligent event predictions at the WTRU, a lack of a unified communication model between AI/ML-based entities at the WTRU and Network Function s (NFs) in the 5GC, and/or a lack of a ML-based optimization mechanism at the WTRU to dynamically assist the WTRU applications to meet their Quality of Service (QOS) requirements by attempting to readjust the 3GPP resources.

For example, certain embodiments may particularly address (i) the predictions that are useful at the WTRU to be exposed to AF/AS and applications running at the WTRU, (ii) how a WTRU may produce such predictions, (iii) architectures for such functionality, (iv) useful signaling for such functionality, (v) how a WTRU may communicate these predictions to the AF/AS and other entities within the 3GPP system (including WTRU and 5GC), and (vi) how the WTRU may use these predictions to optimize its behavior and prevent resource waste.

Example WTRU Architecture for Supporting AI/ML

Example embodiments provide a new architecture for WTRUs (e.g., terminal devices) to exploit AI/ML techniques and dynamically manage established PDU Sessions between the WTRU and the 5GS (5G System). For example, this architecture may address challenges, such as those involved with FL workloads. However, the new components in this architecture can also be used for other applications with dynamic QoS and/or resource management requirements.

Figure 2:
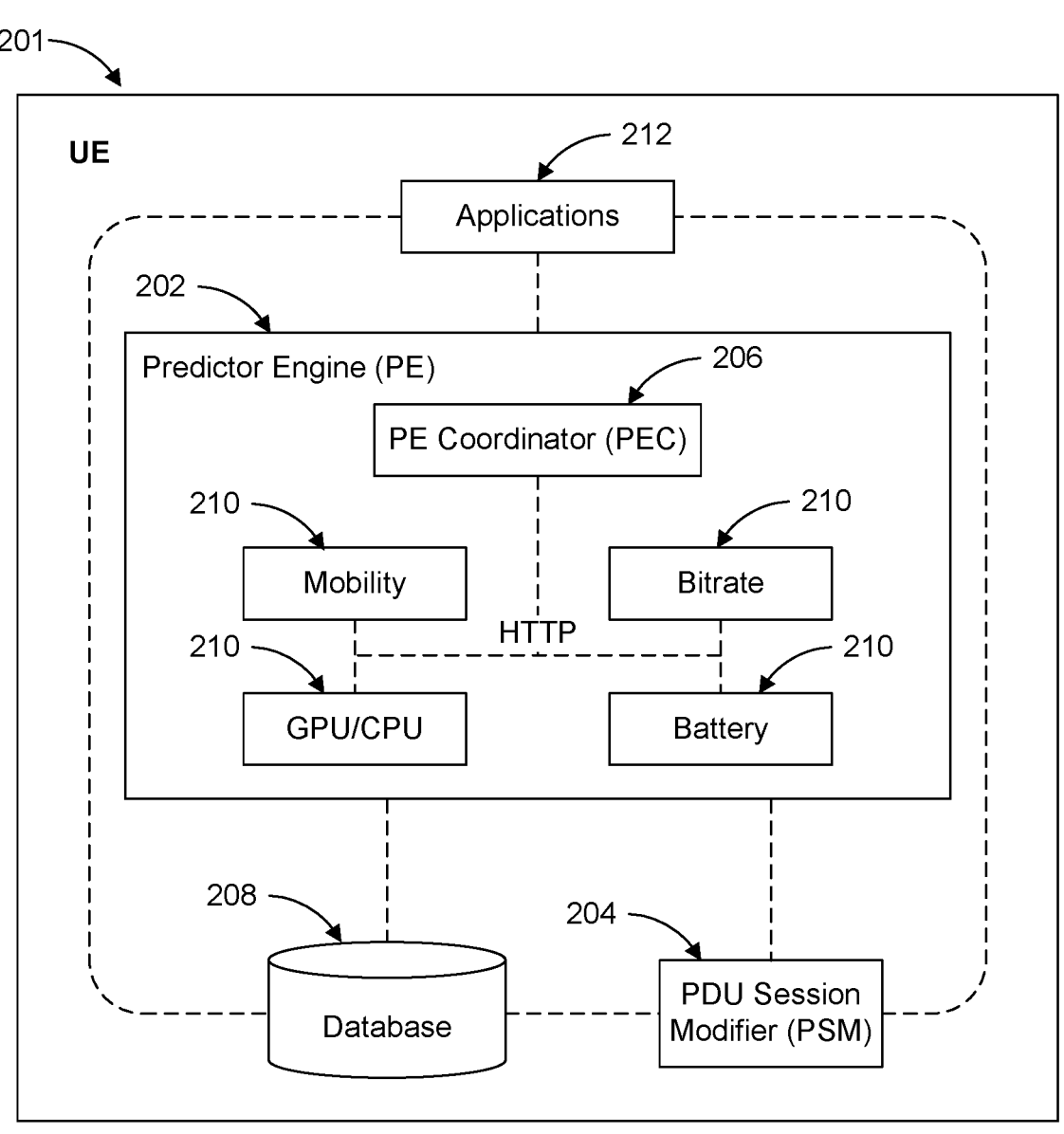
FIG. 2 is a block diagram of a WTRU architecture for supporting AI/ML in accordance with an embodiment.

FIG. 2 is a block diagram of an example embodiment of this architecture which aims to exploit state-of-the-art AI/ML techniques at its core in a unified manner to assist applications 212 by providing diverse, intelligent predictions. This architecture proposes a new layer 202 that may be referred to as the "Predictor Engine" (PE) which hosts several intelligent, potentially ML-based, components to produce important predictions within the WTRU such as available bitrate/capacity, GPU/CPU availability, battery life, and/or user mobility.

In an embodiment, this layer may be built on top of a virtualized platform such as a docker platform (an OS-level virtualization platform), where each predictor module may be run in an isolated container comprising customized software packages, libraries, and operating systems. This can be important for AI/ML-based techniques that typically operate within a specific platform with a particular set of libraries, software packages, and operating systems. Other components in this architecture may include a PDU Session Modifier (PSM) 204, a Predictor Engine Coordinator (PEC) 206, and a database 208 that may also be used similarly in a virtualized environment (e.g., in a docker container) interacting with applications, PE modules, and external entities outside the WTRU (e.g., NWDAF in 5GC, AF, or other WTRUs in the case of Sidelink communication).

This architecture preserves WTRU privacy, preventing the WTRU from providing its row data (personal data) to the third party to produce such predictions. These predictions may be used within the WTRU, Application Function (AF) serving the WTRU, Application Server (AS), and 3GPP entities (e.g., RAN and CN) to optimize various resources (e.g., network, computational, and storage). For example, the proposed PE layer may assist the 3GPP system in optimizing its resources by dynamically managing PDU Sessions via the PSM component. Communication between these components may be through RESTful APIs over, e.g., HTTP/2 [1] connection (the dotted lines in FIG. 2).

Example Predictor Engine

According to certain embodiments, the Predictor Engine (PE) 202 may be an AI engine in which multiple Machine Learning (ML) modules 210 may run in parallel to produce a set of predictions. Each box in the PE layer in FIG. 2 may be an ML module producing a particular prediction. For example, prediction of GPU/CPU usage, prediction of battery life, prediction of available bitrate/capacity, prediction of WTRU's mobility, to only name a few. Each ML module may collect row data, measurements, and/or statistics from the WTRU across its multiple components including applications and even other ML modules. The latter creates an instance of a multi-agent ML scenario where an output of an ML module is used as an input to another ML module. For example, the prediction of WTRU mobility can be used as a state input for the bitrate predictor module, or the output of the bitrate predictor module can be inputted to the GPU/CPU predictor module.

In an embodiment, the communication between the predictor modules 210 as well as the other components in FIG. 2 may be performed over the HTTP/2 protocol (with RESTful APIs). Communication over HTTP/2 with RESTful APIs provides several benefits, for example, including: (i) new (ML-based) modules may be designed and easily integrated into the PE engine and may interact with existing PE's modules over standard APIs; (ii) the PE engine may communicate with other entities outside the WTRU (e.g., 5GS, specifically 5GC which similarly follow a service-based architecture), offering its services to outside consumers (e.g., the PE may receive network data and analytics from the 5GC through NWDAF, or the NWDAF operating in 5GC may receive some predictions regarding the WTRU from the PE engine. These interactions may be performed over the control plane (through Non-Access Stratum (NAS) signaling [4])); (iii) communication over HTTP may be highly secure with well-known encryption techniques that are widely used today (e.g., via TLS); and (iv) resources may be used efficiently at the WTRU due to the stateless nature of RESTful APIs, i.e., service producers (e.g., PE modules) at the WTRU do not need to keep their client's state.

In some embodiments, the internal communications between the PE modules and other modules running at the WTRU may be performed over an unsecured connection to save some compute resources, but it may be preferable to perform external communication more securely.

PE modules may directly feed their predictions to applications, local databases, and other local modules, such as PSM. It is worth highlighting that the PE component could use an orchestration mechanism to manage its containers (or virtual machines) dynamically (e.g., Docker, Kubernetes).

Figure 3:
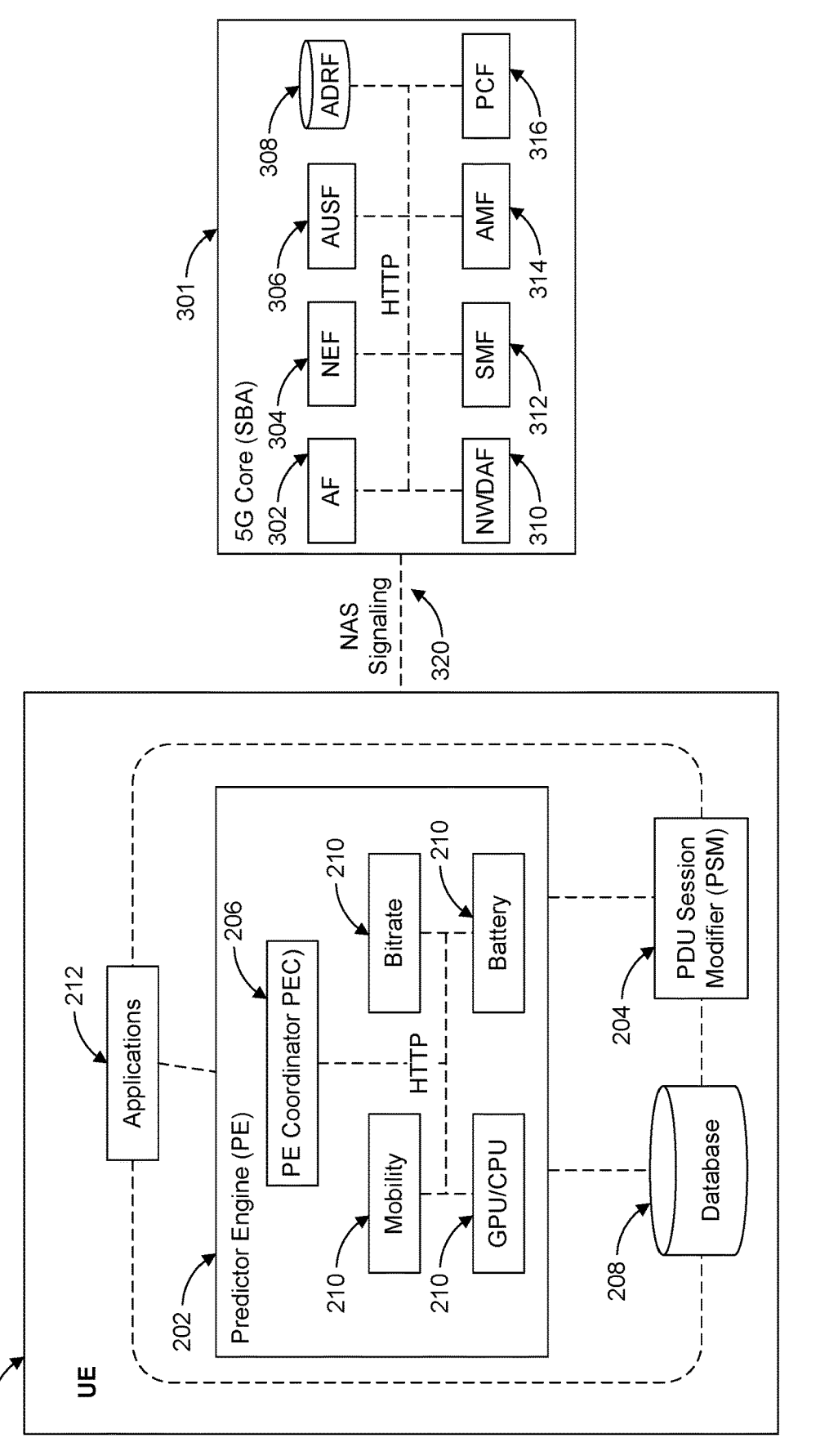
FIG. 3 is a block diagram illustrating NAS signaling between a WTRU and a 5G Core network in accordance with an embodiment.

According to certain embodiments, the PE Coordinator (PEC) 206 is introduced in the PE layer to interface with entities operating outside the PE layer, such as applications, databases, PSM (e.g., see FIG. 3). These interactions may be performed via HTTP. In addition, the PEC may interact with entities outside the WTRU, such as those in the 5GC. The PEC may interact with the 5GC (e.g., AMF, SMF, NWDAF or other NFs) through NAS signaling. Overall, a concern of the PEC 206 is to permit data, predictions, and/or measurements to be exchanged between the WTRU components as well as between the WTRU and external entities optimally. This module may also interact closely with the container/VM orchestration component.

The PE may also include a virtualized network function responsible for keeping track of what the PE modules are onboarded and their statuses, e.g., whether they are activated or not. This could be similar to the Network Repository Function (NRF) in 5GC or, more generally, to the Virtual Network Function (VNF) catalogue or a container repository as part of the Docker platform.

Example PDU Session Modifier (PSM)

According to an embodiment, a responsibility of the PDU Session Modifier (PSM) 204 is to modify PDU Sessions on behalf of applications dynamically. The PSM may operate at the application layer and may interface with the NAS layer to modify PDU Sessions initially established by applications. In an embodiment, an application may express its requirements to the PSM (e.g., bandwidth, latency, reliability, availability, task completion deadlines) and the PSM may then decide what predictions are required for its decision-making to satisfy such requirements. After that, the PSM may activate a set of PE modules (if they are inactive) and may subscribe to them to get event notifications when required predictions (or events) become available. The PSM 204 may either directly interact with the PE modules or via the PEC 206. The PSM feeds these predictions to its optimization algorithms to modify corresponding PDU Sessions to meet the requirements of applications and to optimize WTRU resources dynamically. Such functionality is important for resource optimization, especially with applications that exhibit highly dynamic workflows.

In some embodiments, the decision by the PSM 204 to select a set of forecasts may be skipped when an application directly expresses its required predictions to the PSM, which could be at initial registration time to the PSM or any time during the application lifetime.

The PSM 204 provides several key benefits. Firstly, applications do not need to deal with low-level interactions with the NAS layer. Secondly, applications do not need to know how to interact with the PE modules. That said, applications may prefer to interact with the PE modules either directly or via the PEC 206 to get some predictions for optimizing their behavior regardless of PSM optimizations. Thirdly, the number of PE modules can increase over time in a WTRU or be different in different WTRUs. Thus, to satisfy a particular application's needs, a set of predictions available at a WTRU may be dynamically selected by the PSM 204, and applications do not need to know which predictions or modules are used for modifying their PDU Sessions. In other words, the PSM module may only need to be fully aware of PE modules, not applications. This condition may become more relaxed if the PSM interacts with the PE modules 210 via the PEC 206. In that case, the PEC only needs to be aware of the PE modules 210. It is worth highlighting that the mapping between application requirements and predictions may be enforced by a set of standardized policies and rules.

One goal of the PSM is to prevent resources (e.g., network, radio, computation, storage, and energy) of the WTRU as well as the 3GPP system (including RAN and CN) from being wasted. The following are some tasks that the PSM may perform dynamically: initiate a PDU Session Modification procedure to increase or decrease resources available to application traffic; change the application traffic priority within a PDU Session dynamically; switch User Plane Function (UPF) if the WTRU has multiple active PDU Sessions toward different UPFs, which is a common scenario with Edge Application Servers (EASs); tear down or reactivate a PDU Session; and/or stop or pause applications from continuing their current tasks (e.g., in case they cannot meet the requirements of their applications).

The PSM may interact with the 5GC (e.g., NWDAF, AF, or other NFs) via the PEC component and, in turn, partly over the NAS signaling. This way, the PEC 206 may exchange information (e.g., data, predictions, analytics, and/ or measurements) between the WTRU and the 5GC on behalf of the PSM 204. The PSM component may also interact with the 5GC via the NAS layer (more specifically over NAS-SM signaling, which terminates at the SMF). Finally, it is possible to empower the PSM 204 with ML techniques to make its decision-making more intelligent.

Example Applications and Databases

In this example architecture, applications running at the WTRU may directly interact with the PE 202, PSM 204, and database 208. For example, applications may subscribe to some PE modules 210 to obtain event notifications about a set of predictions (e.g., GPU/CPU usage, available capacity in next time window) either directly or via the PEC 206. This way, applications may proactively adjust their behaviors, and, in turn, the quality of the user experience (e.g., QoE) may be improved. Recall that the PE modules 210, PSM 204, and databases 208 operate at the application layer, preferably within a virtualized and isolated container.

Applications, PE modules, and the PSM may store their information in a database. This is especially useful for the PE modules 210 that typically need to input the history of particular parameters (e.g., history of WTRU's mobility or GPU/CPU usage). In an embodiment, this database may hold information for a short period of time, given that some WTRUs may not be equipped with ample storage (memory) resources. Note that it is also possible to have multiple instances of this database for different activities.

Example Interactions with Entities Outside the WTRU

One of the advantages of using the PE sub-layer within the WTRU is that other entities outside the WTRU may interact with the PE modules (services), for example, by exchanging data, predictions, analytics and/or measurements. For example, an AF hosted in the 5GC can access the WTRU (e.g., via PEC) and may collect a set of predictions from the WTRU and use them locally to make some application-specific decisions (e.g., selecting a set of WTRUs for the next training cycle). Other NFs in the 5GC, such as AMF/SMF, may access the PE layer in a similar way. The WTRU may also access some data and/or analytics produced by NFs in the 5GC. These interactions may be performed (e.g., partly performed) over the NAS signaling, which allows the WTRU and 5GC to communicate with one another securely over the N1 interface. This way, the AMF/ SMF may act as an anchor point, relaying messages between WTRU and other NFs in the 5GC, such as the NWDAF.

FIG. 3 illustrates an example of how the WTRU 201 and 5GC 301 may interact via NAS signaling 320. In an embodiment, the WTRU (PE modules 210) may provide useful predictions (related to the WTRU's network and computation resources) to the 5GC 301, which may then be used to optimize 5GS resources. Similarly, the 5GC may also provide some data and analytics to the WTRU, which may then be used within the PE modules 210 to produce predictions (e.g., the AMF 314 may provide data to the WTRU's mobility prediction module), or other WTRU components such as applications 212 and the PSM 204. The PEC may interact with 5GC NFs (e.g., AMF 314, SMF 312, NWDAF 310) via NAS signaling 320 (over the N1 interface). The 3GPP system can support such interactions and, thus, it may be activated during the WTRU's PDU Session Establishment or Modification procedure [3]. That said, the WTRU may also provide its predictions to the 5GC NFs, such as NWDAF, through an AF. This way, the AF may directly interact with the PEC module to collect a set of WTRU predictions easily.

Figure 4:
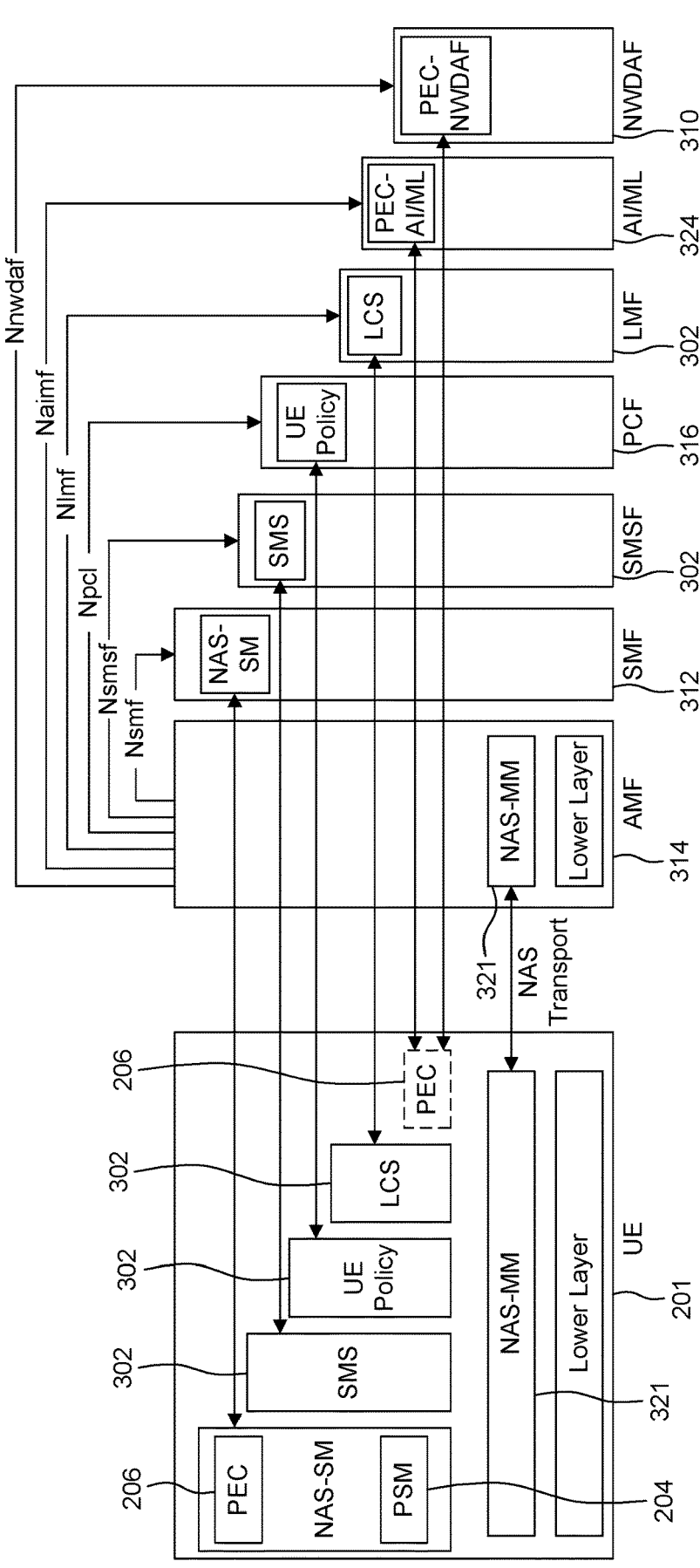
FIG. 4 is a block diagram illustrating PEC and PSM interaction with a 5G Core network in according to an embodiment.

FIG. 4 illustrates one example embodiment of how the PEC and PSM may interact with the 5GC. According to an embodiment, the PSM 204 and PEC 206 may use the "SM" (Session Management Signaling) payload type to interact with the SMF 312 over the NAS-MM protocol. This way, the SMF 312 becomes an anchor point for exchanging data with other 5GC NFs (e.g., AI/ML 324 or NWDAF 310), and NAS messages are passed over AMF transparently. In the case of the PEC 206, it may be preferable to interact with the NFs in the 5GC through the AMF 314 directly (i.e., via new signaling referred to as "PEC signaling"). This way, a NAS message with the payload type of "PEC" may be sent to the AMF 314 from the PEC layer over the N1 interface (via NAS-MM protocol), which is terminated at the AMF. Once the PEC message arrives at the AMF, it may be routed to its destination (based on its message type) via an API-based interaction over HTTP. With PEC signaling, the WTRU may communicate with any 5GC NFs via the AMF. For sending PEC signaling from the WTRU to the AMF, the NAS-MM layer 321 may create a NAS-MM message, including a security header, indicating NAS transport of PEC signaling, and additional information for the receiving NAS-MM 321 to derive how to route the PEC signaling message to its destination. For receiving PEC signaling, the NAS-MM layer 321 may process the NAS-MM part of the message and may walk through the additional information part to determine how and where to derive the PEC signaling message. The PEC signaling part may include the PDU Session ID.

The NAS signaling (i.e., the N1 interface) is not the only way that a WTRU can interact with the 5GC. For instance, the WTRU may interact with the 5GC via AF over the user plane. For example, in the case of 5GC providing data and/or analytics to the WTRU, an AF may be configured to communicate with the WTRU's PEs directly (e.g., via PEC 206). The interaction between the WTRU and the AF may be performed over a transport protocol. This way, the WTRU applications may first request their desired analytics from the PE (e.g., from the PEC). Then, the PEC may communicate with the AF. The AF may then subscribe to a set of NWDAFs (operating in the 5GC) to obtain those requested analytics, either directly or via the Network Exposure Function (NEF), depending on whether the AF is in the trusted domain or the untrusted domain. Once those analytics become available, the AF and, in turn, the PEC may be notified. After that, the PE modules may consume these analytics, and/or they may be provided to other WTRU components such as the PSM. The PSM component may consume these analytics alongside other predictions from the PEs to modify PDU Sessions intelligently. Similarly, if 5GC wants to obtain some predictions from the WTRU, it can interact with a set of PE modules through an AF. In this architecture, the AF may be an anchor point for relaying messages between the WTRUs and the 5GC.

Example Signal Flow Illustrating WTRU Internal and External Interactions

Figure 5:
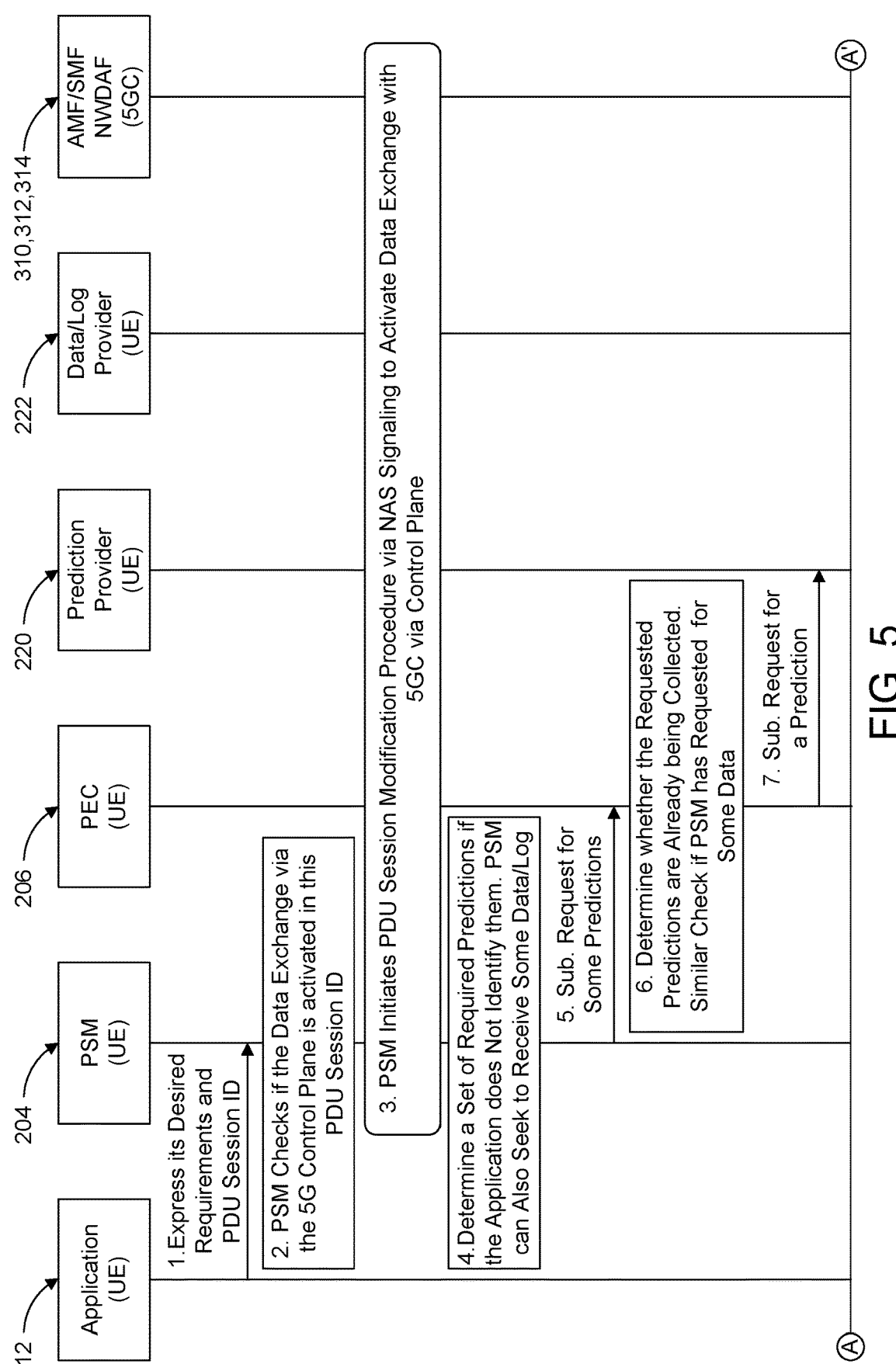
FIG. 5 is a signal flow diagram illustrating signal flow interactions between PE modules, the PSM, WTRU data providers, and 5GC NFs according to an embodiment.
Figure 5:
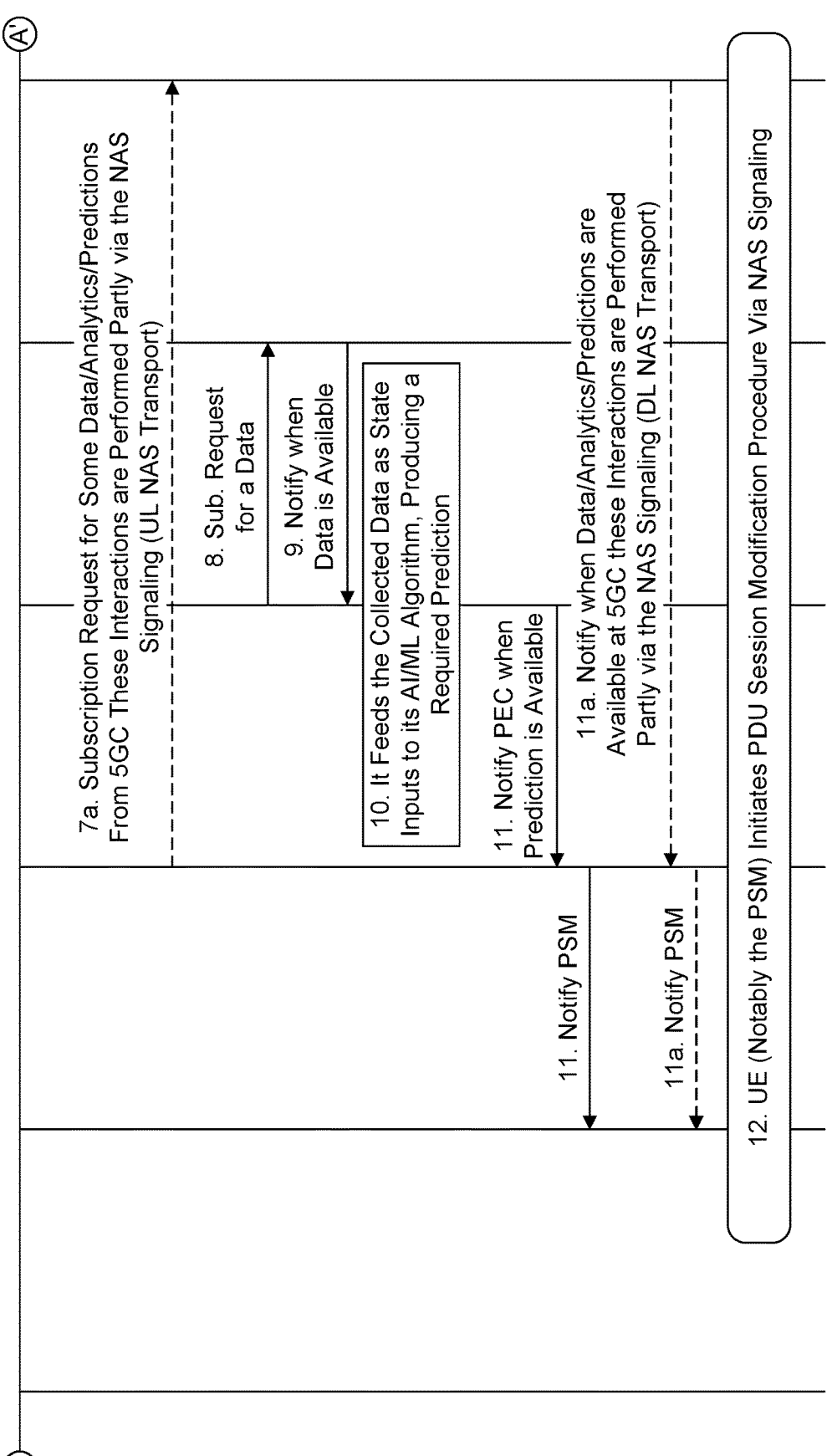

FIG. 5 is a signal flow diagram demonstrating an example embodiment of how the PSM may interact with the PE modules in the WTRU as well as NFs in the 5GC. The procedures and interactions in each step are described in detail as follows.

In step 1, an application 212 may express its desired requirements and/or constraints (e.g., latency, bandwidth, availability and so on) to the PSM 204 via a request/response message type interaction. With this service operation (which may be referred to as "Npsm_PDUSessionModification_ Subscribe"), an application can provide its unique ID and corresponding pduSessiold, dnn, sNssai, supi, amfld, desired QoS profile, 5GSM Core Network Capability as well as other parameters required for PSM to interact with the NAS layer, and in turn 5GC, on behalf of the application. Additionally, an application may indicate what predictions are potentially required to satisfy their requirements/constraints.

Note that the PSM might not handle only a single application. Instead, it may handle PDU Sessions on behalf of multiple or all WTRU applications. This means that the PSM has overarching views about both application requirements and available resources of current PDU Sessions.

Also note that applications may also assist the PSM by providing some data regularly, e.g., end-to-end measurements and/or statistics. This event notification may be subscribed by the PSM itself to the application directly. In other words, an application may be a data source to the PSM or other PE modules.

In step 2, the PSM 204 may check if the currently established PDU Session supports data exchange via the 5G control plane. This check may be performed using information provided by the application layer to the PSM.

In step 3, if the PSM 204 detects that the PDU Session in question does not support data exchange with the 5GC (specifically the AMF/SMF, e.g., 310-312, 314) via the control plane, the PSM may request the 5GC to activate such functionality at the AMF/SMF of the current PDU Session or reselect AMF/SMF. To do this, the PSM may initiate a PDU Session Modification procedure indicating that the AMF/SMF should support such functionality and thus permit the WTRU to exchange information (such as data, analytics, and measurements) with the 5GC over the control plane.

Note that activating such a functionality (i.e., enabling exchange of data/measurements/predictions between a WTRU and the 5GC) may require permission from the 5GC. For example, once the AMF/SMF receives such a request, it may contact the Policy Control Function/Unified Data Management (PCF/UDM) to check if the AMF/SMF is authorized to exchange such information with the WTRU over NAS signaling.

Also note that an application can request/activate such functionality from the 5GC during the PDU Session Establishment/Modification procedure.

In step 4, the PSM may determine a set of required prediction modules at the PE to subscribe if an application does not explicitly express them to the PSM in step 1. The PSM may also seek to collect other data and/or logs from WTRU internal data sources (e.g., applications or radio protocol stack) or external data sources, such as NWDAFs in the CN and/or AFs. The latter case may be done through the PEC 206. It is worth highlighting that the PSM may have a standard mapping through which it can translate application requirements into a set of required predictions. For example, if the WTRU is equipped with more advanced PE modules in the future, this mapping may be updated, meaning that applications do not necessarily need to be aware of the available PE modules at the WTRU. This frees application developers from having to focus on low-level optimizations that the WTRU may perform on their behalf.

In step 5, the PSM may subscribe to a set of prediction modules identified in the previous step. This step may be done either via the PEC or directly with each PE module. The latter may introduce redundancies in delivering predictions where a prediction module may need to notify a set prediction consumer (e.g., the PSM). Still, the former may be advantageous where the PEC may collect a prediction, which can then be notified/delivered to a set of prediction consumers.

Note that the PSM may also indicate to the PEC or PE modules whether to store desired predictions in the database. For simplicity of the call flow in FIG. 5, the interaction with the database is not shown.

Also note that an application may also subscribe to the PEC (or PE modules directly) to obtain event notifications for a set of predictions when they become available. It is possible for the PSM to issue such requests to the PEC on behalf of applications.

In step 6, the PEC may determine whether the PEC is already collecting the requested predictions. If so, the PEC does not need to send a subscription message to the corresponding PE modules again. However, if the current subscriptions need to be updated (e.g., changing some parameters), then the PEC may resend the subscription request message with new parameters to the PE modules. A similar determination may be performed by the PEC if the PSM requests some data and/or log(s).

Note that the PEC may hold predictions and data for a group of prediction consumers and data consumers, respectively. The PSM and other WTRU applications may be data and prediction consumers simultaneously.

Also, note that the PEC may decide whether to store the collected predictions/data in a database (which could be a local WTRU database, or a remote database hosted in a cloud or 5G network). This may also be expressed directly by prediction/data consumers (e.g., PSM or other WTRU applications). Interactions with a database are not shown in FIG. 5 in the interest of simplicity.

In step 7, if the PEC is not currently collecting some requested predictions, it may subscribe to corresponding prediction modules (i.e., prediction providers 220), e.g., via an EventExposure service similar to what is used in 5GC. Alternately or additionally, in step 7a, the PEC may request some analytics from the 5GC over a NAS message to the AMF (e.g., UL NAS Transport). The AMF may then subscribes to the corresponding analytics provider (e.g., an NWDAF instance). Once the AMF receives an event notification, it can relay it back to the WTRU (specifically, the PEC) over a NAS message (DL NAS Transport). Note that the SMF may also be an anchor point for relaying messages between the WTRU and the 5GC. In this way, once the AMF receives the WTRU request via UL NAS Transport message, it may deliver it to the SMF by invoking the Nsmf_PDUSession_UpdateSMContext service operation. In this interaction, the AMF may provide the N1 SM container (i.e., the NAS PDU and PDU Session ID) to the SMF. The SMF may then subscribe to corresponding analytics providers (NWDAFs). Note that the interactions between 5GC entities (e.g., AMF, SMF and NWDAF) is not shown in FIG. 5 to keep the call flow diagram simple.

In step 8, the prediction module(s) may want to collect some data/logs for its prediction algorithm to operate regularly. These data are typically formulated to precisely model the state of the WTRU, and thus some of these data may be commonly required by some of the PE modules. To prevent such redundant data collection by the PE modules, the PEC may collect data/logs on behalf of the PE modules, meaning that the PEC delivers data/logs to each module, rather than each module directly seeking data sources to obtain the required data. This way, each PE module may express its desired data/logs to the PEC. Note that FIG. 5 shows a scenario where each PE module interacts with the data sources directly.

In an embodiment, the interaction in step 8 may be in the form of a subscription/notification API communication or just a data retrieval/pulling from different entities in WTRU (e.g., applications, OS, network/radio protocol stack, and so on).

In step 9, if a data provider 222 follows RESTful APIs, then the Prediction Provider 220 (i.e., a PE module) may subscribe to its EventExposure like service. If so, then the data provider 222 may notify the prediction provider (or, more precisely, data consumer in this case) with the requested data/logs. Note that data provider is used herein broadly to denote any component within the WTRU that can provide data/logs to another component. For example, one of the ML modules 210 in the PE may be a data provider (i.e., a source of data or logs) to another ML module in the PE. For instance, the mobility module may be a source of data to the Bitrate module in the PE or to the PSM component. In another example, the radio protocol stack could be a data provider to one or more PE modules. A data source also could be any entity within the 5GC, e.g., NWDAF, SMF, AMF.

In step 10, once the Prediction Provider 220 collects its required input data (e.g., all required input data), it may feed it to its (AI/ML) algorithm, and in turn, produces required prediction(s).

In step 11, when a Prediction Provider (i.e., a PE module) produces the required predictions, it may notify and/or deliver the predictions to the PEC. After that, the PEC 206 may notify and/or deliver the predictions to the PSM 204. Note that predictions may also be delivered to the PSM 204 directly from the Prediction Provider 220, depending on the subscription request of the PSM/PEC. This alternative is illustrated by the dotted line in step 11a in FIG. 5. This step is related to data, analytics, and/or measurements, e.g., that come from the 5GC over the control plane partly over the NAS signaling. For example, as discussed in connection with step 7a, the PEC may request some analytics from the 5GC over a NAS message to the AMF (e.g., UL NAS Transport). The AMF may then subscribe to the corresponding analytics provider (e.g., an NWDAF instance). Once the AMF receives an event notification, it can relay it back to the PEC (step 11(a)) over a NAS message (DL NAS Transport). The SMF may also be an anchor for relaying messages between the WTRU and the 5GC. New NAS message types may be defined to identify these sorts of messages between WTRUs and the 5GC.

In step 12, the PSM 204 may collect all its predictions and data/logs for its optimization objectives. It can then decide, e.g., with the help of an ML-based technique, how to modify PDU Session resources to provide better QoS handling for WTRU applications. The PSM initiates a PDU Session Modification procedure to dynamically adjust the resources of a PDU Session across the (R)AN and 5GC (SMF/UPF). The PSM may also pause or terminate applications activities based on its decision. The PSM may rely on NAS signaling to interact with the 5GC, although direct interaction between the PSM and NFs in the 5GC is theoretically feasible over other transport mechanisms. A benefit of using the NAS signaling is that it allows the WTRU to communicate with the 5GC over a secured and authorized channel.

FIG. 6 is a flowchart illustrating a representative method in accordance with an embodiment. For example, FIG. 6 may illustrate a method for providing analytics, data, and/or predictions, e.g., using AI/ML techniques. In some embodiments, the method of FIG. 6 may be implemented by a WTRU, for example. In other example embodiments, the method of FIG. 6 may be performed by other network nodes or elements.

As illustrated in the example of FIG. 6, the method may include, at 610, receiving an indication of requirements and/or constraints associated with one or more WTRU applications. According to certain embodiments, the requirements and/or constraints may include, but are not limited to, any one or more of QoS requirements, latency, bandwidth, availability, and/or reliability.

Based on the requirements and/or constraints associated with the one or more WTRU applications, the method may include, at 620, determining one or more ML based analytics, data, and/or predictions to request from a network and/or from internal ML modules of the WTRU. For example, the network may be a 3GPP and/or 5G core network that may include one or more core network nodes (e.g., AMF, SMF, UPF, MME, SGW, NWDAF, etc.). According to some embodiments, the ML based analytics, data, and/or predictions may be associated with any one or more of availability of computational resources, network capacity, signal strength or quality, and/or battery status, for example.

In an embodiment, the method of FIG. 6 may include, at 630, sending, to the network or the internal WTRU ML modules, a request or subscription for the one or more ML based analytics, data, or predictions. According to one example, the sending 630 may include sending the request or subscription to the network via any of non-access stratum (NAS) signaling or user plane (UP) protocol. In some embodiments, the sending 630 may include sending the request or subscription to the internal WTRU modules via hypertext transfer protocol (HTTP).

According to some embodiments, the method may include a predictor engine coordinator (PEC) entity generating the request or subscription and sending the generated request or subscription to the network via NAS signaling. In an embodiment, the PEC entity may be configured to operate as part of a NAS-SM layer or standalone on top of a NAS-MM layer.

In certain embodiments, the method may include the internal WTRU ML modules generating the one or more ML based analytics, data, and/or predictions relating to operation of the WTRU. According to some example embodiments, the internal WTRU ML modules may include, but is not limited to, one or more of the following: a ML module configured to generate a prediction of available bit rate at the WTRU, a ML module configured to generate a prediction of a mobility condition of the WTRU, and a ML module configured to generate a prediction of a usage rate of the processing unit.

According to an embodiment, the method of FIG. 6 may include, at 640, receiving a response or notification of the one or more ML based analytics, data, and/or predictions from the network and/or the internal WTRU ML modules.

In some embodiments, the method may include dynamically modifying, by a PDU Session Modifier (PSM) entity, PDU sessions associated with the one or more WTRU applications. For example, the modifying of the PDU sessions may include modifying, by the PSM, PDU sessions to satisfy capacity requirements of the associated applications and to optimize usage of WTRU resources. According to an embodiment, the method may further include the PSM receiving application resource requirements from at least one of the applications, selecting prediction module(s) relevant to determining suitable PDU session parameters for a PDU session associated with the at least one of the applications, and activating the selected prediction module to generate a prediction of the determined PDU session parameter.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, MME, EPC, AMF, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the various embodiments have been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

REFERENCES

The following references may have been referred to hereinabove and are incorporated in full herein by reference.

[1] IETF RFC 7549. Hypertext Transfer Protocol Version 2 (HTTP/2). https://datatracker.ietf.org/doc/html/rfc7540.
[2] 3GPP TS 23.501 V17.1.1 (2021-06). System architecture for the 5G System (5GS); Stage 2 (Release 17).
[3] 3GPP TS 23.502 V17.1.0 (2021-06). Procedures for the 5G System (5GS); Stage 2 (Release 17).
[4] 3GPP TS 24.501 V17.5.0 (2021-12). Non-Access-Stratum (NAS) protocol for 5G System (5GS); Stage 3; (Release 17).
[5] 3GPP TS 23.288 V17.1.0 (2021-06). Architecture enhancements for 5G System (5GS) to support network data analytics services (Release 17).

What is claimed is:

1. A Wireless Transmit/Receive Unit (WTRU), comprising:
a transceiver; and
a processor configured to:
receive an indication of any of a requirement and a constraint associated with one or more WTRU applications;
based on any of the requirement and the constraint associated with the one or more WTRU applications, determine one or more machine learning (ML)-based analytics to request or subscribe from a network element;
send, to the network element, a request or a subscription for the one or more ML-based analytics; and
receive a response indicating the one or more ML-based analytics from the network element; and

a protocol data unit (PDU) session modifier (PSM) entity configured to modify a PDU session associated with the one or more WTRU applications, wherein the PSM is configured to:
receive one or more application resource requirements from at least one of the one or more WTRU applications,
select at least one prediction module relevant to a determination of suitable PDU session parameters for a PDU session associated with the at least one of the one or more WTRU applications, and
activate the at least one selected prediction module to generate a prediction of the suitable PDU session parameters.

2. The WTRU of claim 1, wherein the request or the subscription is sent to the network element via any of non-access stratum (NAS) signaling or a user plane (UP) protocol.

3. The WTRU of claim 1, wherein any of the requirement and the constraint comprises any of:
quality of service (QOS) requirements;
a latency;
a bandwidth;
an availability; or
a reliability.

4. The WTRU of claim 1, wherein the one or more ML-based analytics are associated with any of:
an availability of computational resources;
a network capacity;
a signal strength;
a signal quality; or
a battery status.

5. The WTRU of claim 1, comprising:
a predictor engine coordinator (PEC) entity configured to:
generate the request or the subscription; and
send the generated request or the generated subscription to the network element via non-access stratum (NAS) signaling.

6. The WTRU of claim 5, wherein the PEC entity is configured to operate as part of a NAS-session management (NAS-SM) layer or to operate standalone on a layer above a NAS-mobility management (NAS-MM) layer.

7. The WTRU of claim 1, comprising one or more internal WTRU ML modules configured to generate the one or more ML-based analytics relating to operation of the WTRU, wherein the one or more internal WTRU ML modules comprise any of:
a ML module configured to generate a prediction of available bit rate at the WTRU;
a ML module configured to generate a prediction of a mobility condition of the WTRU; or
a ML module configured to generate a prediction of a usage rate of the processor.

8. The WTRU of claim 1, wherein the PSM is configured to modify the PDU session to satisfy a capacity requirement of an associated application or to improve usage of WTRU resources.

9. A method implemented by a Wireless Transmit/Receive Unit (WTRU), the method comprising:
receiving an indication of any of a requirement and a constraint associated with one or more WTRU applications;
based on any of the requirement and the constraint associated with the one or more WTRU applications, determining one or more machine learning (ML)-based analytics to request or subscribe from a network element;

sending, to the network element, a request or a subscription for the one or more ML-based analytics;

receiving a response indicating the one or more ML-based analytics from the network element;

modifying, by a protocol data unit (PDU) session modifier (PSM) entity, a PDU session associated with the one or more WTRU applications;

receiving, by the PSM, one or more application resource requirements from at least one of the one or more WTRU applications;

selecting, by the PSM, at least one prediction module relevant to a determination of suitable PDU session parameters for a PDU session associated with the at least one of the one or more WTRU applications; and activating the at least one selected prediction module to generate a prediction of the suitable PDU session parameters.

10. The method of claim 9, wherein the sending comprises sending the request or the subscription to the network element via any of non-access stratum (NAS) signaling or a user plane (UP) protocol.

11. The method of claim 9, wherein any of the requirement and the constraint comprises any of:

quality of service (QOS) requirements;

a latency;

a bandwidth;

an availability; or a reliability.

12. The method of claim 9, wherein the one or more ML-based analytics are associated with any of:

an availability of computational resources;

a network capacity;

a signal strength;

a signal quality; or a battery status.

13. The method of claim 9, comprising:

generating, by a predictor engine coordinator (PEC) entity, the request or the subscription; and sending, by the PEC, the generated request or the generated subscription to the network element via non-access stratum (NAS) signaling.

14. The method of claim 13, wherein the PEC entity is configured to operate as part of a NAS-session management (NAS-SM) layer or to operate standalone on a layer above a NAS-mobility management (NAS-MM) layer.

15. The method of claim 9, comprising generating, by the one or more internal WTRU ML modules, the one or more ML-based analytics, data, or predictions relating to operation of the WTRU, wherein the one or more internal WTRU ML modules comprise any of:

a ML module configured to generate a prediction of available bit rate at the WTRU;

a ML module configured to generate a prediction of a mobility condition of the WTRU; or a ML module configured to generate a prediction of a usage rate of a processing unit of the WTRU.

16. The method of claim 9, comprising modifying, by the PSM, the PDU session to satisfy a capacity requirement of an associated application or to improve usage of WTRU resources.

17. A non-transitory computer readable medium comprising program instructions stored thereon, wherein the program instructions are configured to control an apparatus to:

receive an indication of any of a requirement and a constraint associated with one or more WTRU applications;

based on any of the requirement and the constraint associated with the one or more WTRU applications, determine one or more machine learning (ML)-based analytics to request or subscribe from a network element;

send, to the network element, a request or a subscription for the one or more ML-based analytics; and receive a response indicating the one or more ML-based analytics from the network element;

modify, by a protocol data unit (PDU) session modifier (PSM) entity, a PDU session associated with the one or more WTRU applications;

receive, by the PSM, one or more application resource requirements from at least one of the one or more WTRU applications;

select, by the PSM, at least one prediction module relevant to a determination of suitable PDU session parameters for a PDU session associated with the at least one of the one or more WTRU applications; and activate the at least one selected prediction module to generate a prediction of the suitable PDU session parameters.

* * * * *